United States Patent [19]

Strickler et al.

[11] Patent Number: 4,883,444
[45] Date of Patent: Nov. 28, 1989

[54] COUPLING FOR TRANSMITTING A ROTARY MOTION

[75] Inventors: Ernst Strickler, Wolfhausen; Hansueli Wild, Jona, both of Switzerland

[73] Assignee: Mettler Instrumente AG, Greifensee, Switzerland

[21] Appl. No.: 191,587

[22] Filed: May 9, 1988

[30] Foreign Application Priority Data

Jun. 2, 1987 [CH] Switzerland ............... 2092/87

[51] Int. Cl.4 .................................. F16D 41/06
[52] U.S. Cl. ............................ 464/160; 192/44
[58] Field of Search ............. 192/38, 44, 45, 105 BA; 464/139, 152, 160

[56] References Cited

U.S. PATENT DOCUMENTS

| | | | |
|---|---|---|---|
| 2,720,300 | 10/1955 | Muhlbeyer | 192/105 BA |
| 3,074,227 | 1/1963 | Fujiyoshi et al. | 464/160 X |
| 3,388,779 | 6/1968 | Roper | 192/44 |
| 4,111,288 | 9/1978 | Fogelberg | 192/44 X |
| 4,438,836 | 3/1984 | Kagata | 192/44 X |
| 4,620,621 | 11/1986 | Kulczycki et al. | 192/44 X |

Primary Examiner—Daniel P. Stodola
Attorney, Agent, or Firm—Toren, McGeady & Associates

[57] ABSTRACT

A coupling for transmitting a rotary motion in both directions of rotation. The coupling includes a drive shaft and a driven shaft and has a freewheeling capability in both directions of rotation for rotary motions introduced into the driven shaft. One or more balls are guided in a circular groove having an asymmetrical cross-section. The balls rest against a clamping disk having a non-circular cross-section. When the drive shaft is rotated, the balls are pressed against and clamped by a guide surface of the driven shaft.

6 Claims, 3 Drawing Sheets

1

COUPLING FOR TRANSMITTING A ROTARY MOTION

BACKGROUND OF THE INVENTION

1. Field of the Invention

The present invention relates to a coupling for transmitting a rotary motion in both directions of rotation. The coupling includes a drive shaft and a driven shaft and a freewheeling capability in both directions of rotation for rotary motions introduced into the driven shaft.

2. Description of the Prior Art

In modern analytical balances, one or more housing components are opened by sliding them by means of an electric drive in order to make the weighing dish accessible. A rigid connection between the electric drive and the housing component to be opened is not desired because it must always be possible to manually operate the balance in certain types of applications.

A coupling of this general type in an analytical balance is disclosed in European patent application 0216035. When the drive for opening and closing a housing component is turned on, this coupling effects a frictional connection with the housing component. When one of the housing components is operated manually, the connection between the housing part and the drive motor is interrupted. For this purpose, a rotor shaft with a friction wheel fastened on the rotor shaft is movably supported in a V-shaped guide slot in such a way that, when the drive motor is switched on, the rotor shaft of the drive motor rolls off in the guide slot and moves the friction wheel towards the surface of the housing component. When the rotary motion of the rotor shaft is stopped, the rotor shaft slides in the guide slot back into the initial position in which the friction wheel does not have contact with the housing component. Thus, a drive connection exists between the motor and the housing component only when the rotor shaft is rotating.

The operation of the above-described known coupling is satisfactory as long as the parts of the coupling do not become worn or dirty. A regular maintenance is required for operating this coupling without problems.

It is, therefore, the primary object of the present invention to overcome the disadvantages of the known couplings.

Specifically, it is the object of the present invention to provide a coupling for transmitting a rotary motion, wherein the rotary motion generated by a motor on the drive shaft can be transmitted in both directions of rotation, while torques resulting from manual operation, i.e., sliding, of one or more of the housing components are not transmitted to the input shaft of the coupling, i.e., to the motor.

SUMMARY OF THE INVENTION

In accordance with the present invention, a clamping disk is placed on the drive shaft. The clamping disk has at least one partial constriction or recess. Underneath the clamping disk, a circumferential surface is defined which is located essentially concentrically with the axis of rotation and is inclined relative to the horizontal. At least one ball is placed on the circumferential surface. A cage having an inwardly facing guide surface is placed on the end of the driven shaft. The cage encloses the clamping disk and the circumferential surface.

The coupling for transmitting a rotary motion in accordance with the present invention has the principal advantage that rotary motions or torques are transmitted by the coupling in one direction, i.e., from the input side to the output side in clockwise as well as counterclockwise direction, while rotary motions imparted to the output shaft of the coupling are not transmitted to the input shaft.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1:
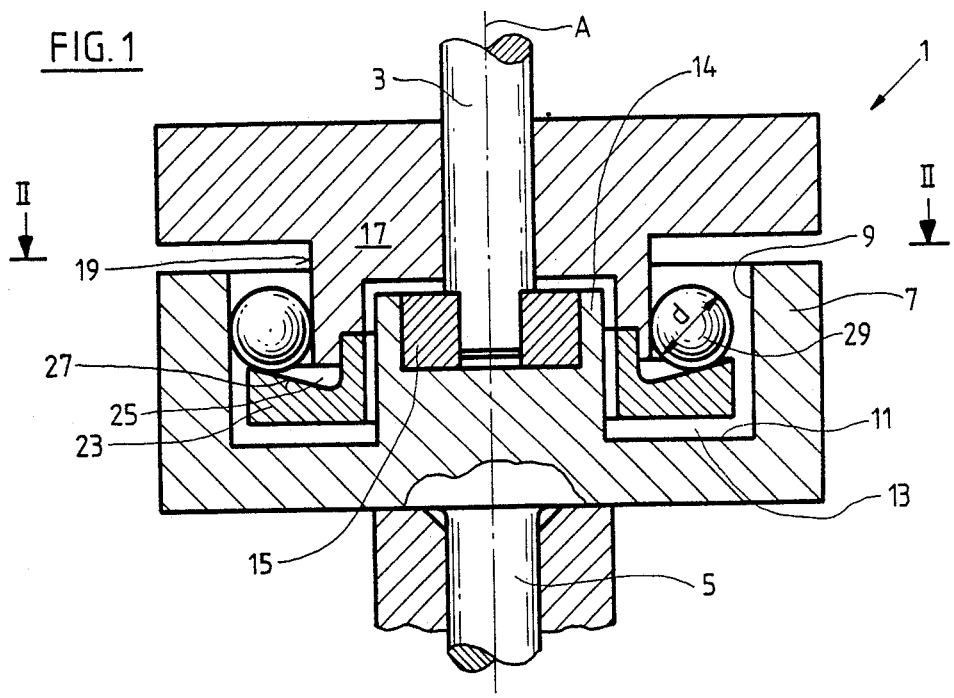
FIG. 1 is a sectional view in axial direction of a coupling according to the present invention.

In FIG. 1 of the drawing, the coupling according to the present invention is denoted by reference numeral 1. Coupling 1 has two rotatable shafts 3 and 5 which extend on a vertical axis A. Shaft 3 is connected to a drive motor, not shown. Driven shaft 5 is in connection with a slidable housing component of a balance, not shown.

A cage 7 is mounted on driven shaft 5 so as to rotate with driven shaft 5. Cage 7 has an inwardly facing guide surface 9 which is essentially cylindrically-shaped. On the level of guide surface 9, a bearing 15 is placed on shaft 3. Bearing 15 is seated in a sleeve 14 which is placed on a bottom 11 of a recess 13 of cage 7 or forms part of the recess 13.

Figure 2A:
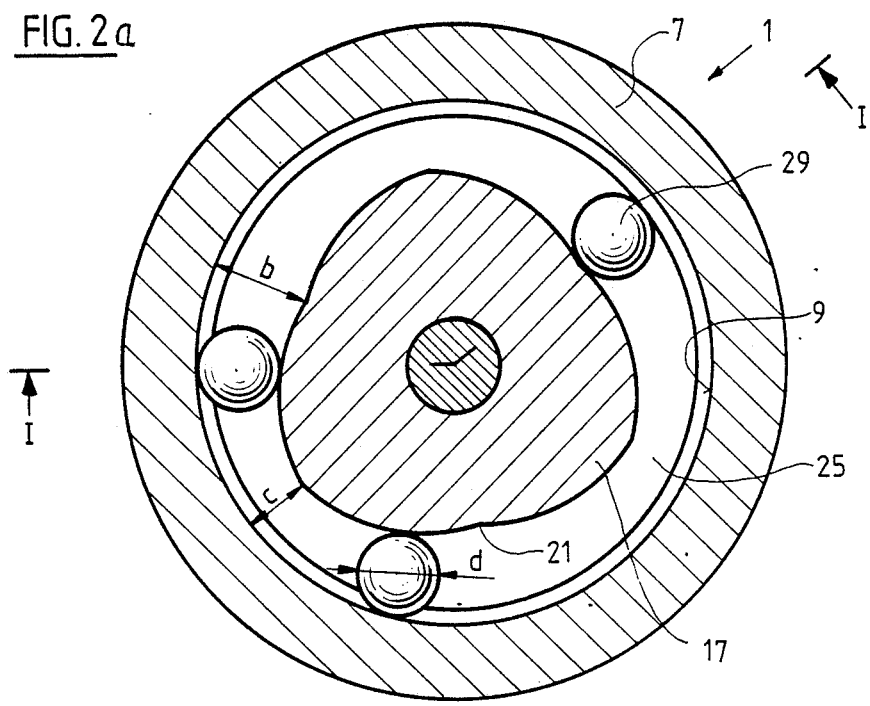
FIGS 2a-2c are transverse sectional views of the coupling of FIG. 1 taken along sectional line II—II showing the coupling in three different positions of operation.
Figure 2B:
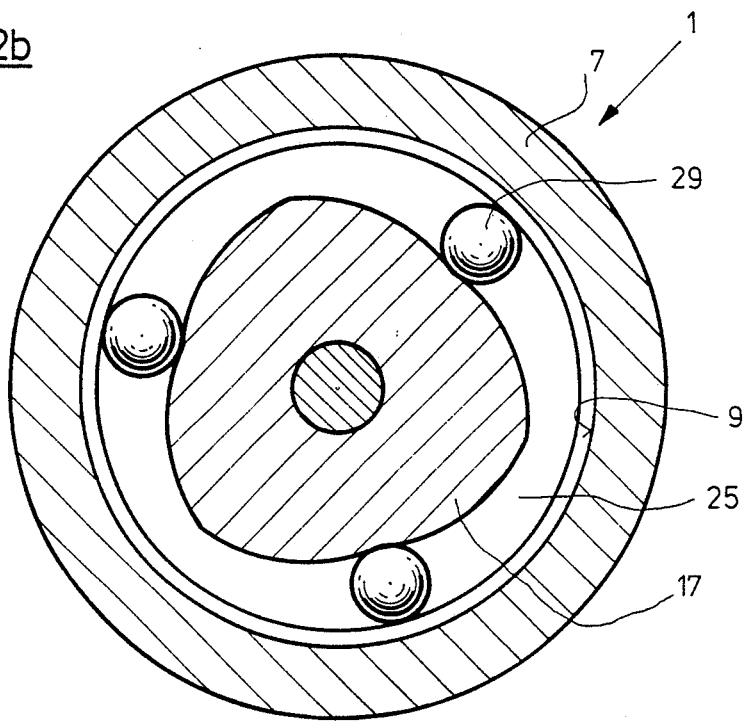
Figure 2C:
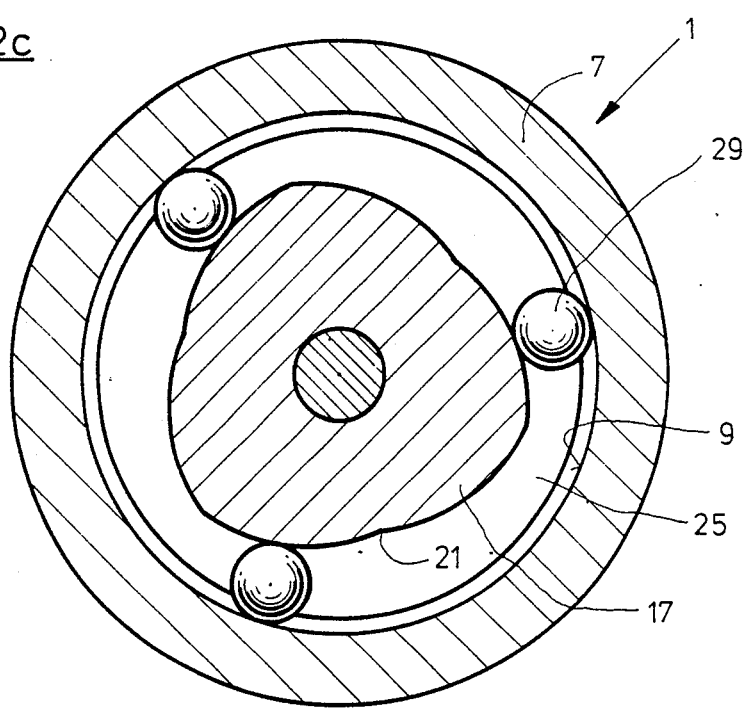

A clamping disk 17 is mounted on drive shaft 3 so as to rotate with drive shaft 3. The clamping disk 17 has a peripheral surface 19 which is partially provided with at least one restriction 21, as can be seen in FIG. 2. As shown in FIGS. 2a-2c, three constrictions 21 are provided. Of course, a different number of constrictions is also possible.

An annular plate 23 whose outer diameter is greater than the diameter of peripheral surface 19 is arranged underneath disk 17. One or more grooves 25 are arranged in the plate 23. The sides or circumferential surfaces 27 of the grooves 25 are inclined relative to the horizontal and extend to the periphery of plate 23. Plate 23 is fixedly connected to shaft 3 through clamping disk 17.

One or more balls 29 are placed in each groove 25. Preferably, the number of balls 29 corresponds to the number of constrictions 21. The balls 29 have a diameter d which is smaller than the greatest radial distance b and greater than the smallest radial distance c between the peripheral surface 19 of disk 17 and the guide surface 9. The geometric shape of the peripheral surface 19 is composed preferably of logarithmic spiral portions, so that an always constant clamping angle is obtained independently of tolerances of the balls 29 and/or the guide surfaces 9. Of course, a different suitable shape can also be selected. Preferably, the centers of the balls 29 are located in the same plane as bearing 15.

FIGS. 2a–2c of the drawing show balls 29 in three different positions. The balls 29 as seen in FIG. 2c are placed in constrictions 21 and are only in contact with disk 17. Thus, no connection exists between drive shaft 3 and driven shaft 5.

As seen in FIG. 2c the balls 29 are clamped between the disk 17 and the guide surface 9 as a result of a counterclockwise rotation of shaft 3. The balls 29 shown in FIG. 2a have been moved by a clockwise rotation of shaft 3 from the disk 17 toward the outside against the guide surface 9.

Of course, in actual operation of the coupling 1, all balls 29 are always in the same symmetrical position relative to disk 17, i.e., the balls are either in the neutral position in the constrictions 21 or all balls are simultaneously placed in front of or behind the constrictions 21.

In the following, the operation of the coupling 1 shall be explained.

When the driven shaft 5 is rotated, the rotary motion is not transmitted to the shaft 3 in either direction of rotation because no force-transmitting connection exists between the two shafts 3 and 5. If, on the other hand, a rotation of shaft 3 takes place, each ball 29 is also placed in motion. Due to the centrifugal force acting on the ball and the inertness of the ball 29 on the side 27, the ball 29 rolls outwardly and the disk 17 which rotates faster than the ball 29 causes the ball 29 to be clamped in the narrowing space between the guide surface 9 and the periphery 19 of disk 17. The flat clamping angle between the guide surface 9 and the periphery 19 results in a frictional engagement with cage 7, so that cage 7 and, thus, shaft 5 are rotated.

The symmetrical shape of the peripheral surface 19 of disk 17 makes possible a rotation of the cage 17 in the above-described manner in both directions of rotation.

As soon as the rotary motion effected by the drive is interrupted, each ball 29 rolls back on the inclined side 27 into the constriction 21 and the connection between the two shafts 3 and 5 is interrupted.

Figure 3:
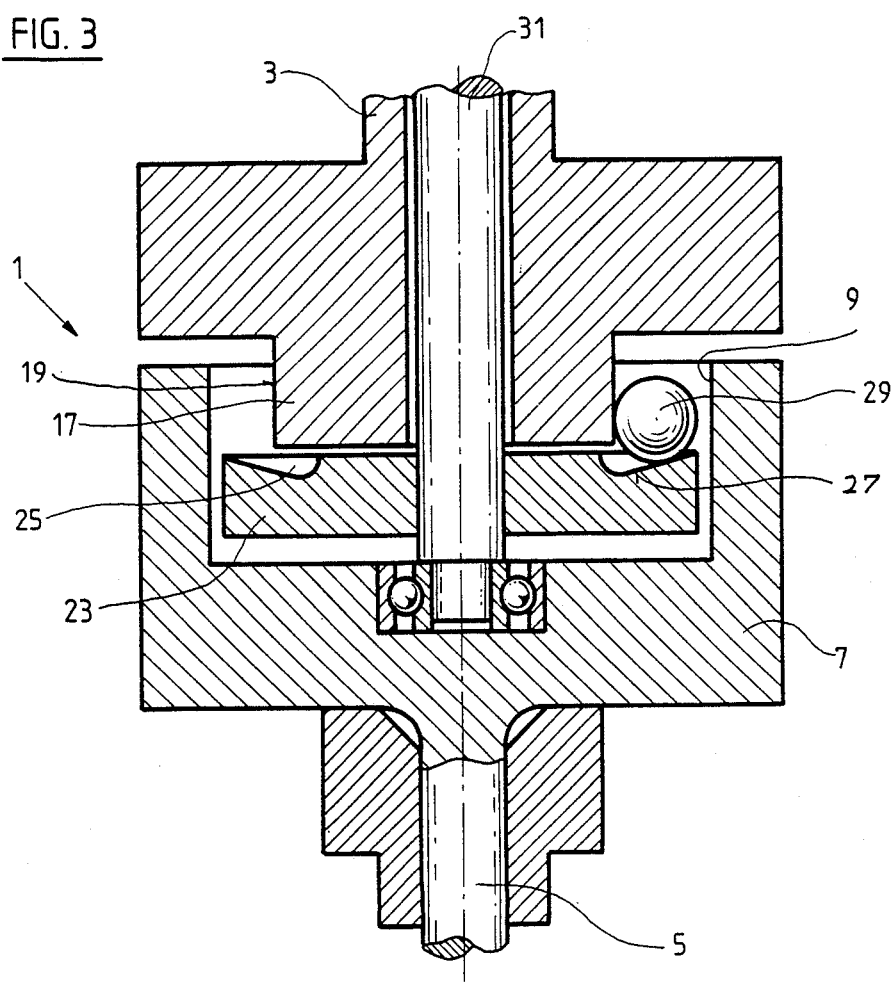
FIG. 3 is a sectional view in axial direction of another embodiment of the coupling according to the present invention.

The embodiment of the coupling 1 according to the present invention illustrated in FIG. 3 differs from the embodiment shown in FIG. 1 in that the plate 23 including rolling surface 27 is not fixedly connected to disk 17. Rather, plate 23 stands still during operation. In ordr to achieve this, disk 17 forms part of a hollow supporting shaft 3. Hollow shaft 3 including disk 17 are mounted rotatably on a stationary shaft 31 which supports plate 23.

In the coupling 1 according to FIG. 3, the cage 7 is placed in motion with delay because ball 29 is successively forced outwardly predominantly as a result of the rolling friction at the peripheral surface 19 of disk 17 until clamping and engagement at the guide surface 9 takes place.

Of course, the coupling according to the present invention can be used for a purpose other than the one described above.

While specific embodiments of the invention have been shown and described in detail to illustrate the application of the inventive principles, it will be understood that the invention may be embodied otherwise without departing from such principles.

We claim:

1. A coupling for transmitting a rotary motion in both directions of rotation, the coupling including a vertically extending drive shaft and a vertically extending driven shaft having an axis of rotation, the driven shaft having an end, a clamping disk mounted on the drive shaft, the clamping disk defining a peripheral surface, the peripheral surface having at least one partial constriction, an annular plate mounted between the drive shaft and the driven shaft, the annular plate defining a circumferential surface opposite the clamping disk, the circumferential surface being located essentially concentrically with the axis of rotation and being inclined relative to the horizontal, at least one ball having a diameter being placed on the circumferential surface, and a cage attached to the end of the driven shaft, the cage defining a guide surface facing the peripheral surface of the clamping disk and the circumferential surface, a spacing defined between the peripheral surface and the guide surface, the spacing being greater than the diameter of the at least one ball at the constriction and being smaller than the diameter of the at least one ball at at least a portion of the peripheral surface, such that the coupling has a freewheeling capability in both directions for rotary motion introduced into the driven shaft when the at least one ball is located at the constriction and that when the drive shaft is rotated the at least one ball is moved radially outwardly and in clamped engagement between the peripheral surface of the clamping disk and the guide surface of the cage resulting in a transmission of rotary motion from the drive shaft to the driven shaft.

2. The coupling according to claim 1, wherein the annular plate is connected to the clamping disk so as to rotate therewith.

3. The coupling according to claim 1, wherein the annular plate is mounted so as to be stationary.

4. The coupling according to claim 1, wherein the clamping disk has one or more symmetrically shaped constrictions.

5. The coupling according to claim 4, wherein the periphery of the clamping disk defines clamping surfaces, the one or more constrictions being defined by the clamping surfaces, the geometric shape of the clamping surfaces corresponding to logarithmic spirals.

6. The coupling according to claim 1, wherein the driven shaft is supported by a bearing, the bearing being arranged in the same plane as the centers of the balls.

* * * * *